(12) United States Patent
Hooda et al.

(10) Patent No.: US 10,397,060 B2
(45) Date of Patent: Aug. 27, 2019

(54) IDENTITY-BASED POLICY IMPLEMENTATION IN NETWORK ADDRESS TRANSLATION (NAT) ENVIRONMENTS

(71) Applicant: Cisco Technology, Inc., San Jose, CA (US)

(72) Inventors: Sanjay Kumar Hooda, Cupertino, CA (US); Syam Sundar V Appala, Santa Clara, CA (US); Kaushik Kumar Dam, San Jose, CA (US); Vimarsh Puneet, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 348 days.

(21) Appl. No.: 15/447,291

(22) Filed: Mar. 2, 2017

(65) Prior Publication Data

US 2018/0255017 A1    Sep. 6, 2018

(51) Int. Cl.
    *G06F 15/16*     (2006.01)
    *H04L 12/24*     (2006.01)
    *H04L 29/08*     (2006.01)
    *H04L 29/12*     (2006.01)

(52) U.S. Cl.
    CPC ...... *H04L 41/0893* (2013.01); *H04L 61/2514* (2013.01); *H04L 61/2571* (2013.01); *H04L 67/306* (2013.01); *H04L 61/2521* (2013.01)

(58) Field of Classification Search
    USPC ...................................................... 709/219
    See application file for complete search history.

(56) References Cited

U.S. PATENT DOCUMENTS

| | | | |
|---|---|---|---|
| 7,023,847 B2 * | 4/2006 | Zhang | H04L 29/12367 370/389 |
| 7,694,343 B2 * | 4/2010 | Sobel | H04L 63/105 726/22 |

(Continued)

FOREIGN PATENT DOCUMENTS

| | | |
|---|---|---|
| CN | 100555954 C | 10/2009 |
| CN | 102377828 A | 3/2012 |

(Continued)

*Primary Examiner* — Alicia Baturay
(74) *Attorney, Agent, or Firm* — Edell, Shapiro & Finnan, LLC (57) ABSTRACT

A policy server correlates information from several messages associated with a client device to implement an identity-based network access policy. The policy server receives a first message from a network element connected to the client device. The first message requests an identity-based policy for the client device, and includes a first network address. The policy server receives a second message from an identity server. The second message includes information indicating an identity role and a second network address. The policy server receives a third message from a NAT device. The third message includes a NAT mapping that correlates the first network address with the second network address. After the policy server determines the identity-based policy based on a combination of the first message, the second message, and the third message, the policy server implements the identity-based policy in the network element.

20 Claims, 5 Drawing Sheets

(56) References Cited

U.S. PATENT DOCUMENTS

| | | | |
|---|---|---|---|
| 7,930,429 B2* | 4/2011 | Maloo | H04L 29/12066 709/219 |
| 8,005,981 B2* | 8/2011 | Tuck | H04L 29/12066 709/238 |
| 8,165,091 B2* | 4/2012 | Nix | H04L 29/125 370/331 |
| 8,289,958 B1* | 10/2012 | Narayanan | H04L 12/66 370/352 |
| 8,792,448 B2* | 7/2014 | Nix | H04W 36/00 370/329 |
| 8,953,592 B2 | 2/2015 | Krishna et al. | |
| 9,083,587 B2 | 7/2015 | Babu et al. | |
| 9,712,422 B2* | 7/2017 | Burbridge | H04L 61/1511 |
| 10,158,998 B2* | 12/2018 | Ahmadzadeh | H04L 61/2571 |
| 2016/0080316 A1 | 3/2016 | Gonzalez Pizarro et al. | |

FOREIGN PATENT DOCUMENTS

| | | |
|---|---|---|
| CN | 103139326 A | 6/2013 |
| WO | 201307055 A1 | 7/2013 |

* cited by examiner

IDENTITY-BASED POLICY IMPLEMENTATION IN NETWORK ADDRESS TRANSLATION (NAT) ENVIRONMENTS

TECHNICAL FIELD

The present disclosure relates to identity-based network policies.

BACKGROUND

Identity-based network policies enable network administrators to control access to a network based on the type of user and/or device connecting to the network. When a new device connects to a network, it can be assigned an identity by the network provider. The network provider maintains policies for each identity, and each policy is implemented on the network elements of the network to ensure that the new device has the appropriate access level for its assigned identity. One example of an identity server is an Active Directory™ (AD) server that authenticates a user that logs in through a client device. The AD server authenticates the user and assigns the user's client device an identity based on the authentication session with the user.

DESCRIPTION OF EXAMPLE EMBODIMENTS

Overview

In one embodiment, a computer-implemented method is provided for a policy server to correlate information from messages associated with a client device in a network in which network address translation (NAT) is being performed by a NAT device. The policy server receives a first message from a network element connected to the client device. The first message requests an identity-based policy for network communications of the client device. The first message includes a first network address. The policy server receives a second message from an identity server. The second message includes information indicating an identity role and a second network address. The policy server receives a third message from the NAT device. The third message includes a NAT mapping that correlates the first network address with the second network address. The NAT device translates the first network address to the second network address in an authentication session between the client device and the identity server. After the policy server determines the identity-based policy based on a combination of the first message, the second message, and the third message, the policy server implements the identity-based policy in the network element.

Detailed Description

One example of dynamic host on-boarding scenarios uses a combination of an identity server (an AD server) and a policy server (also referred to herein as an Identity Services Engine (ISE)). The identity server authenticates a user/device and sends session information through a connection (an AD connector) between the identity server and the policy server. The policy server may use the session information to re-classify the user and perform a Change of Authorization (CoA) based on the identity information provided by the identity server. Typically, the policy server will receive information/metadata from the identity server for user sessions (e.g., Internet Protocol (IP) address, username, group, host information). The policy server will also receive client information/metadata from a network element (router or switch) about network addresses (IP address, Media Access Control (MAC) address) of client devices. The client information may be obtained by the policy server through the Remote Authentication Dial-In User Service (RADIUS) protocol.

Without a NAT service in the authentication session, the policy server can correlate the identity information with the client information through the network address (IP address) provided in both sets of information. However, the addition of a NAT service breaks the correlation of the IP address, and prevents the network elements from implementing the appropriate policy based on the identity of the client devices. The techniques presented herein provide for improving the operations of the policy server to correlate the identity information with the appropriate client information by receiving the NAT mapping from the NAT service (in a new accounting record).

Figure 1:
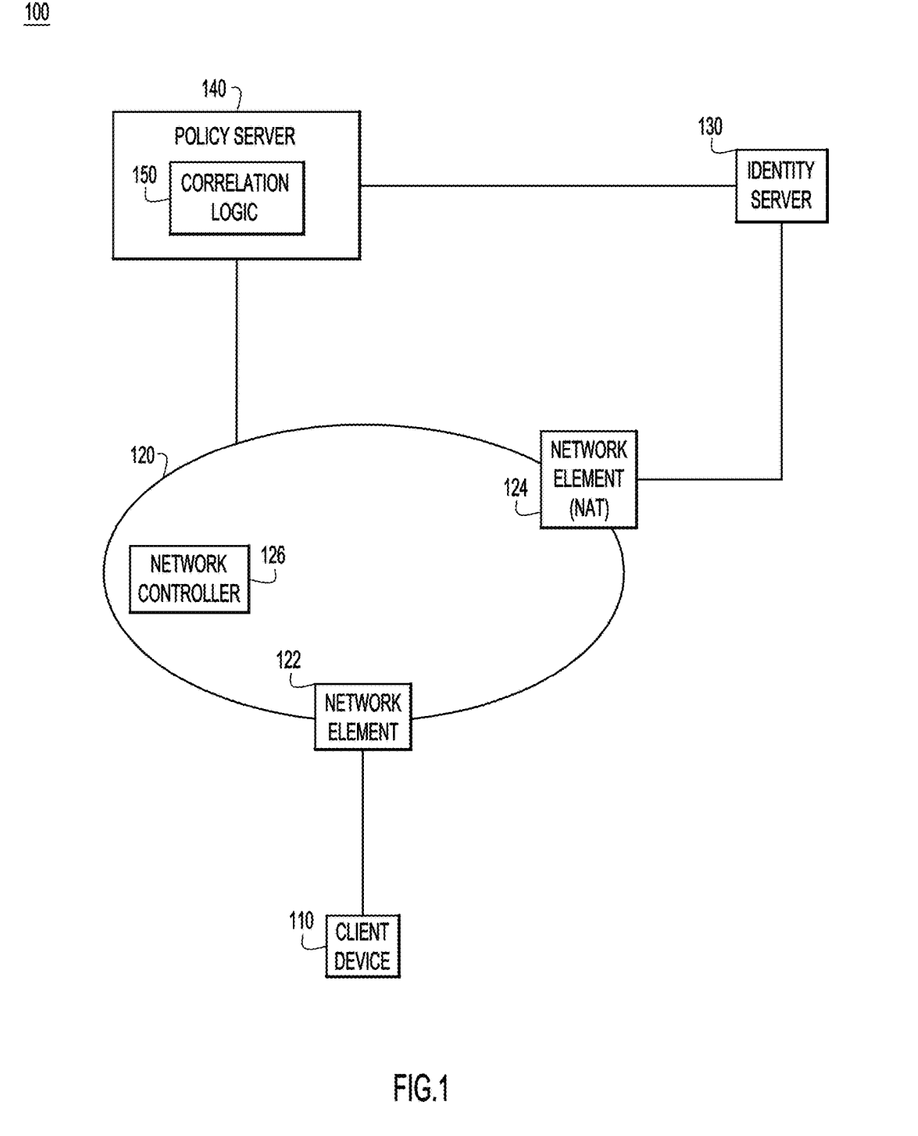
FIG. 1 is a simplified block diagram of a system to implement identity-based network policies in a network in which a network address translation (NAT) service is being performed on a network element, according to an example embodiment.

Referring now to FIG. 1, a simplified block diagram of an identity-based policy system 100 is shown. A client device 110 connects to a network 120 through a network element 122. The network 120 also includes a network element 124 running a NAT service and a network controller 126. The network 120 may also include a plurality of other network elements, which are not shown in FIG. 1. An identity server 130, such as an AD server, and a policy server 140, such as an ISE, are connected to the network 120. The policy server 140 includes correlation logic 150 enabling the policy server 140 to obtain and correlate information from the network element 122, the NAT network element 124, and the identity server 130. The correlation logic 150 enables the policy server 140 to determine an identity-based policy to allow the client device 110 to access the network 120.

In one example of dynamic on-boarding of the client device 110, the client device 110 first connects to the network element 122 and obtains an IP address, such as, via Dynamic Host Configuration Protocol (DHCP) mechanisms. A user of the client device 110 logs in and authenticates with the identity server 130. As part of the authentication session, the identity server 130 saves session information, such as the username, user group, client/host type, and IP address of the client device 110 in the session. The network element 122 also learns client information, such as MAC address and IP address, associated with the client device 110. However, the authentication session between the client device 110 and the identity server 130 traverses the NAT network element 124, which ensures that the IP address that the network element 122 associates with the client device 110 differs from the IP address that the identity server 130 associates with the client device 110.

In another example, changes in the identity server 130 (e.g., the client device may authenticate with a different identity), the NAT network element 124 (e.g., a change in the NAT mapping), or the policy server 130 (e.g., the network administrator changes the policy for a given identity) may require the policy server 140 to implement a new identity-based policy in the network 120. The policy server 140 may be required to re-correlate the client information, NAT mapping, and identity information to determine the updated identity-based policy to implement in the network 120.

Figure 2:
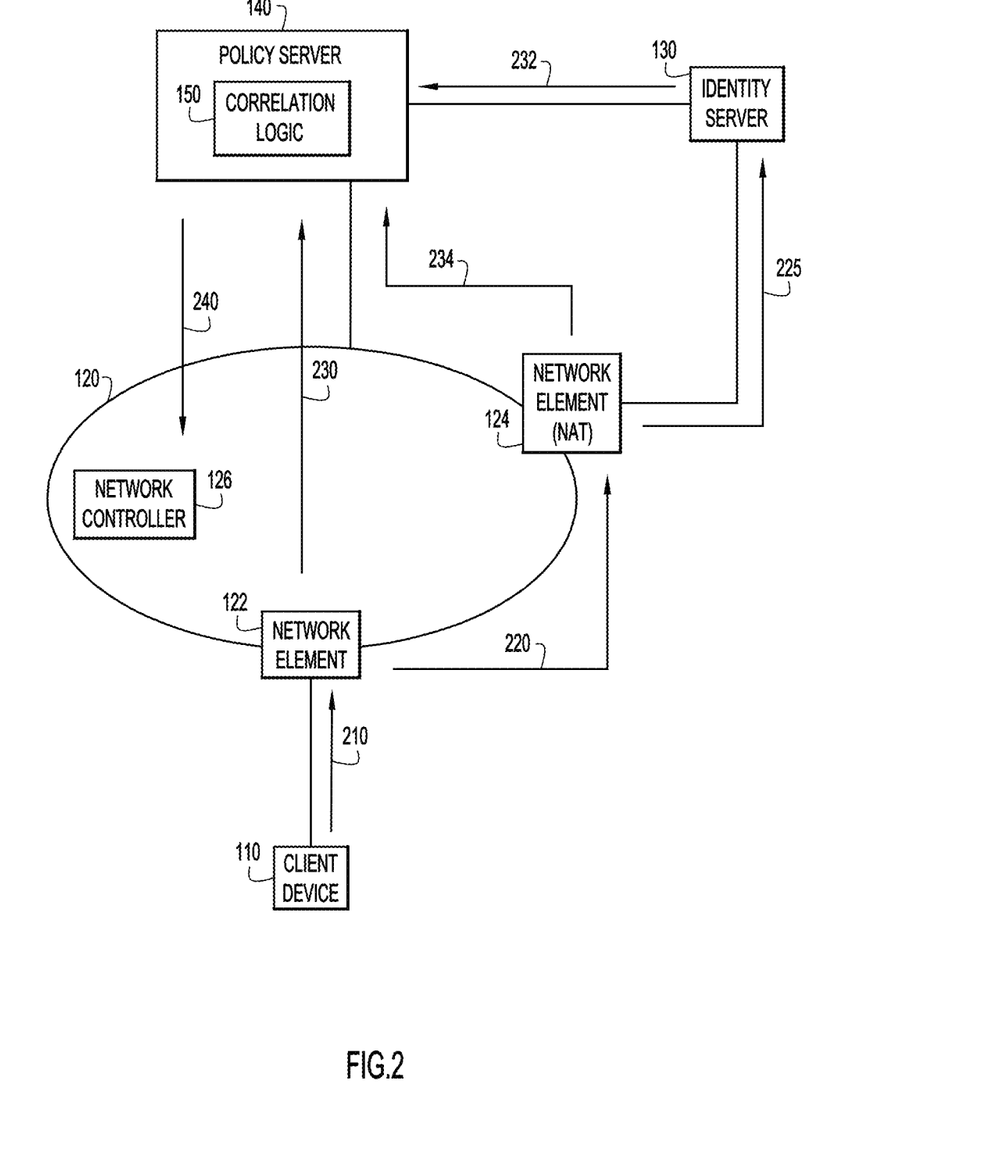
FIG. 2 is a simplified block diagram illustrating messages passed between devices to implement identity-based network policies in a network with a NAT service, according to an example embodiment.

Referring now to FIG. 2, a simplified block diagram shows the messages between the computing devices in the identity-based policy system. When the client device 110 initially connects to the network 120 through the network element 122, the network element 122 receives a message 210 that includes the IP address and the MAC address of the client device 110. The message 210 may also include a request to authenticate with the identity server 130, and the message 210 is forwarded to the NAT device 124 as message 220. The NAT network element 124 translates the IP address of the message 220 into a new IP address in message 225 according to a NAT mapping that is stored in the NAT network element 124.

The policy server 140 collects client information (e.g., a first IP address, MAC address, etc.) in message 230 from the network element 122 and identity information (e.g., a second IP address, an identity/role, etc.) in message 232 from the identity server 130. The policy server also collects a NAT mapping (e.g., the correspondence of the first IP address to the second IP address) in message 234 from the NAT device 124. In one example, the NAT device 124 enhances its Authentication, Authorization, and Accounting (AAA) module/function to send NAT mappings to the policy server as AAA accounting records in a RADIUS protocol exchange.

By correlating the information from messages 230, 232, and 234 using the correlation logic 150, the policy server 140 can determine an appropriate identity-based policy and send it to the network controller 126 in a message 240. The network controller 126 may then implement the identity-based policy through the rest of the network elements in the network 120 (e.g., network element 122). Alternatively, the policy server 140 may implement the identity-based policy in the network 120 by sending the relevant policy information directly to the network elements in the network 120.

The correlation logic 150 receives input from three sources:
1. Identity information 232 (e.g., username, user group, client/host type, second IP address, etc.) from the identity server 130. The identity information 232 may be derived from the session information of an AD authentication session.
2. Client information 230 (e.g., network parameters: MAC address, first IP address) from the network element 122 that is connected to the client device 110.
3. NAT records 234 (e.g., correlation between the first IP address and the second IP address) from the NAT network element 124. The NAT records 234 may be sent as an AAA record to the policy server 140.

Figure 3:
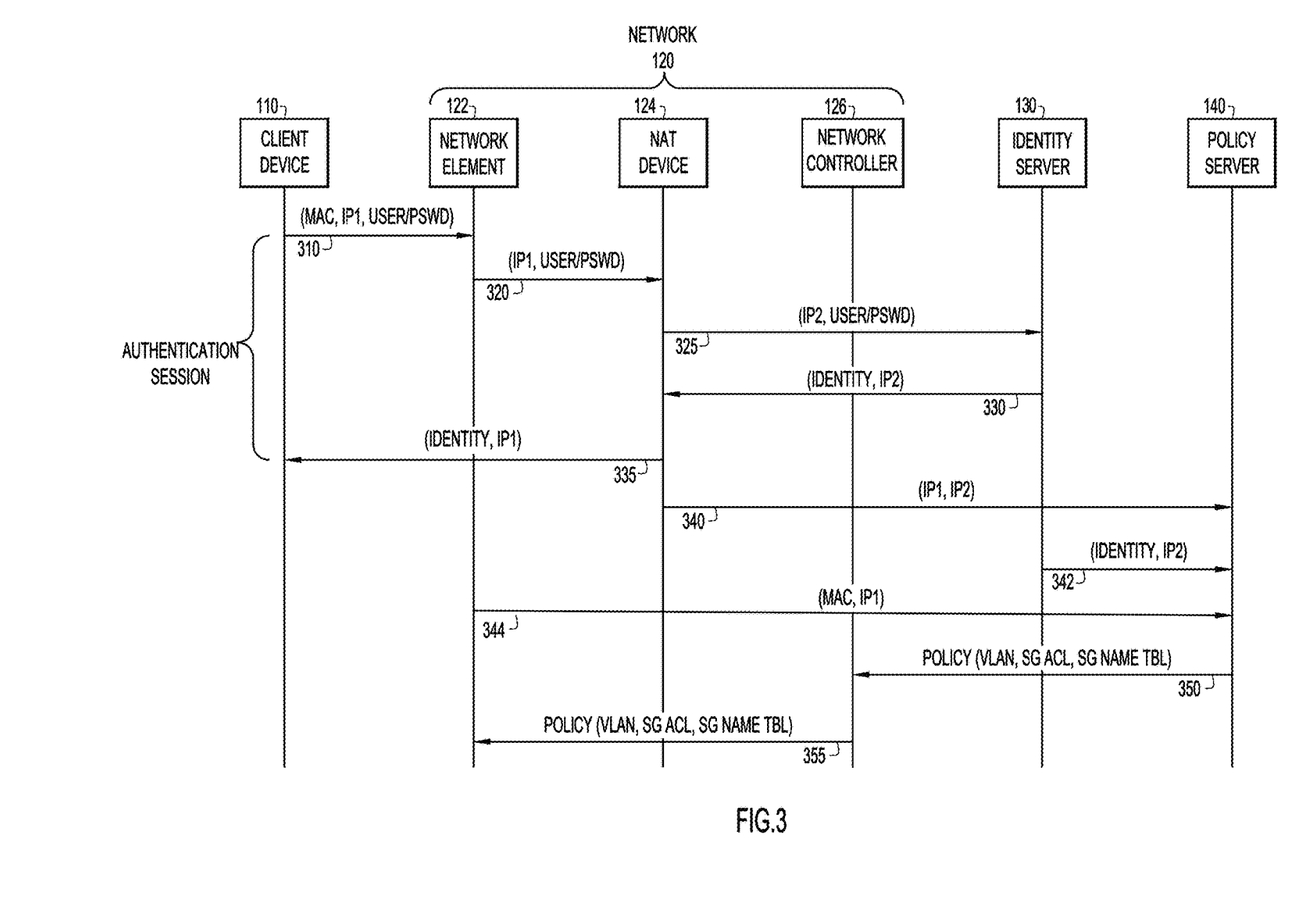
FIG. 3 is a ladder diagram illustrating messages passed between computing devices in implementing identity-based network policies, according to an example embodiment.

Referring now to FIG. 3, a ladder diagram shows messages passed between computing devices in implementing an identity-based network access policy. Initially, the client device 110 joins the network 120 and starts an authentication session by sending message 310 to the network element 122. The message 310 includes information about the client device 110 (e.g., MAC address, IP address), as well as information for the authentication session (e.g., username and password). In one example, the information in message 310 may be conveyed in more than one message. In other words, the client information may be sent in a separate message from the request to set up the authentication session and receive an identity for the client device 110.

The network element 122 forwards the request for an identity in the authentication session to the NAT device 124 in message 320. The NAT network element 124 translates the IP address of the incoming message 320 (e.g., IP1) to a new IP address (e.g., IP2) that is used in message 325. The message 325 is sent to the identity server 130. The identity server 130 authenticates the credentials (e.g., username/password) in the message 325 and determines an identity for the client device 110. The identity may be specific to the user or the identity may define a role of the user and/or client device (e.g., administrator, employee, security, etc.). The identity server 130 may complete the authentication session by sending information (e.g., the authenticated identity/role) back toward the client device in message 330. The NAT network element 124 receives the message 330 and translates the IP address (e.g., IP2) back to the internal IP address (e.g., IP1) of the client device 110, and forwards the session information to the client device 110 in message 335.

The NAT network element 124 sends the NAT mapping (e.g., IP1 maps to IP2) in a message 340 to the policy server 140. The NAT network element 124 may send the message 340 any time after the first message 320 is translated through the NAT network element 124. In one example, the NAT network element 124 may send the message 340 with the NAT mapping in response to a request from the policy server 140. In another example, the message 340 may include the network address (e.g., IP address) of the identity server 130. The message 340 may be sent whenever a client device tries to contact the identity server 130 (e.g., to initiate the authentication session with message 320).

Similarly, the identity server 130 sends information from the authentication session (e.g., the identity/role of the client device, IP2, etc.) to the policy server 140 in message 342. Additionally, the network element 122 sends the client information (e.g., MAC address, IP1) to the policy server in message 344.

In one example, the network element 122 sends the client information to the policy server 140, since the endpoint devices do not typically have a trust relationship with AAA servers, such as the policy server 140. In another example, messages 340, 342, and 344 may be sent independently in any order. One or more of the messages 340, 342, and 344 may be sent to the policy server 140 in response to a request from the policy server 140 or triggered by other independent actions.

Once the policy server 140 has received the messages 340, 342, and 344, it determines an appropriate network access policy for the client device specified in message 344 based on the authenticated identity specified in message 342. The NAT mapping in message 340 enables the policy server 140 to correlate the client information in message 344 with the identity information in message 342. The policy server 140 sends the identity-based policy (such as Virtual Local Area Network (VLAN) information, Security Group (SG) Access Control List (ACL), SG Name Table, etc.) to the network controller 126 in message 350. The network controller 126 implements the policy in the network 120, including network element 122, by sending message 355 with the identity-based policy information.

Figure 4:
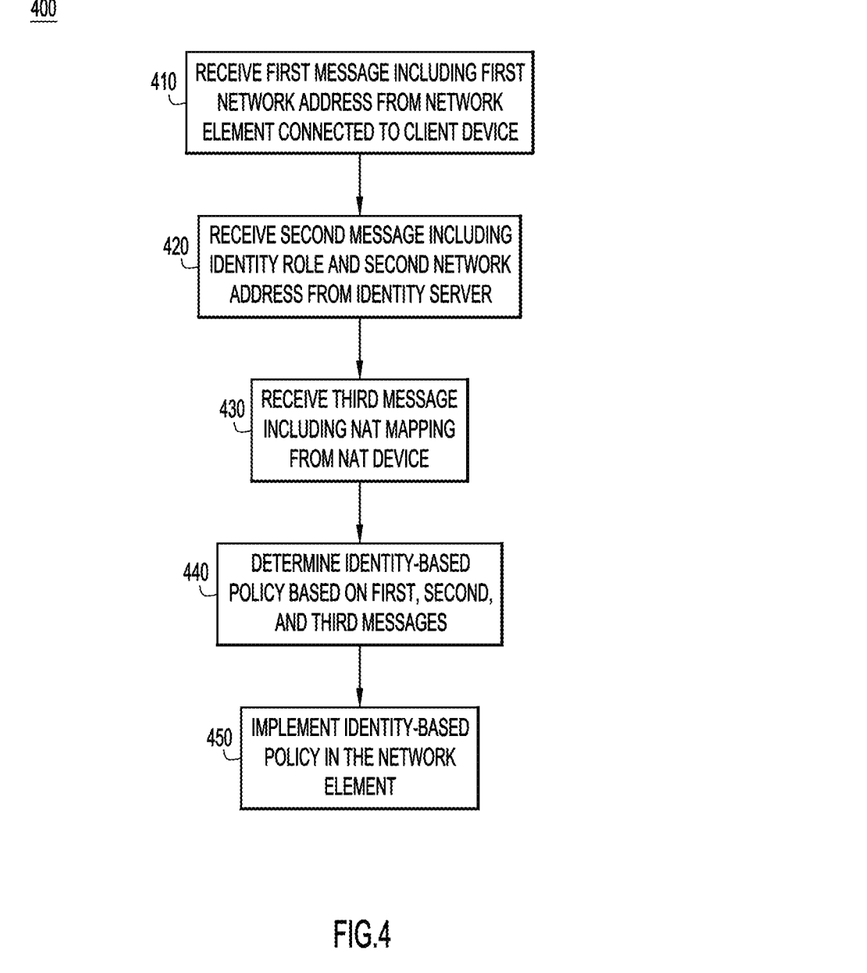
FIG. 4 is a flow chart illustrating the operations performed by a policy server in implementing identity-based network policies, according to an example embodiment.

Referring now to FIG. 4, a flow chart is shown that illustrates operations performed by a policy server (e.g., policy server 140) in a process 400 for implementing an identity-based network access policy. In step 410, the policy server receives a first message from a network element connected to a client device. The first message includes a first network address. In step 420, the policy server receives a second message from an identity server. The second message includes an identity role and a second IP address. In step 430, the policy server receives a third message from a NAT network element. The third message includes a NAT mapping correlating the first network address with the second network address. In one example, the NAT network element translates the first network address to the second network address in an authentication session between the client device and the identity server.

In step 440, the policy server determines an identity-based policy based on the information in the first message, the second message, and the third message. The information in the third message enables the policy server to correlate the information in the first message with the information in the second message. In step 450, the policy server implements the identity-based policy in the network element that is connected to the client device. In one example, the identity-based policy is implemented in the network element by sending the policy to the network controller that is charge of the network element connected to the client device. Alternatively, the policy server may directly interact with the network elements in the network without the assistance of the network controller.

Figure 5:
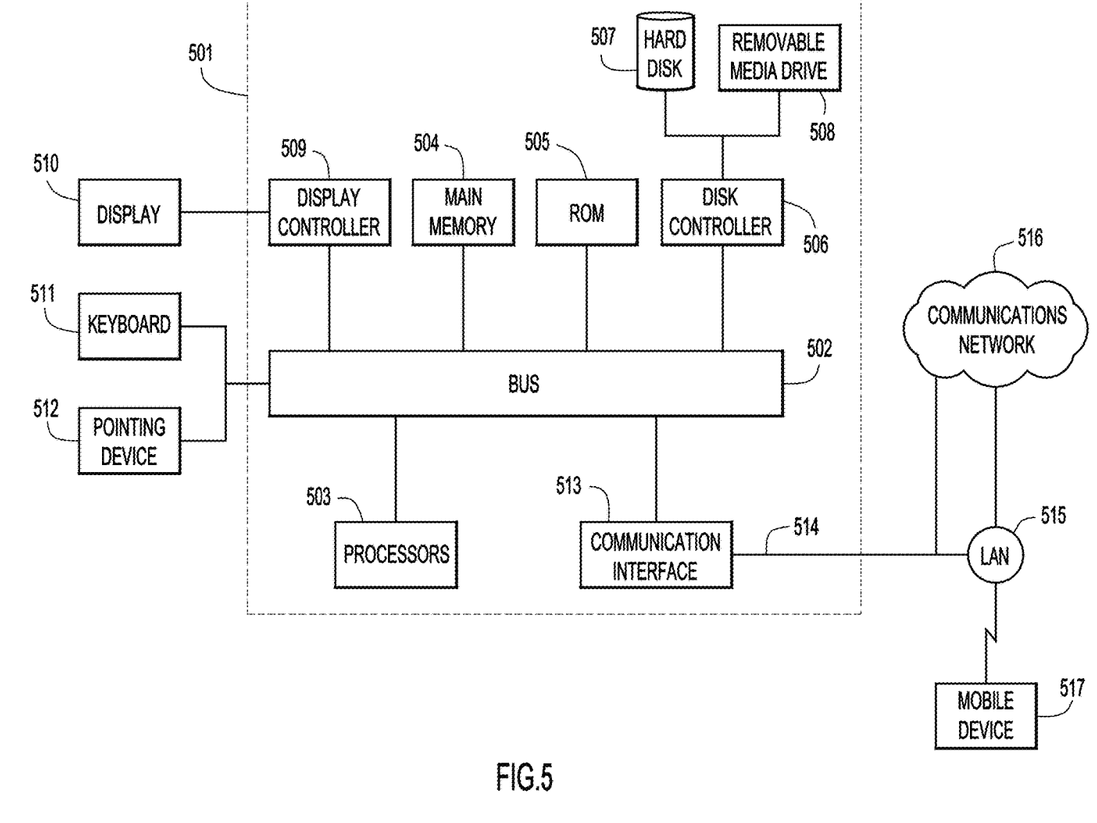
FIG. 5 is a simplified block diagram of a device that may be configured to perform methods presented herein, according to an example embodiment.

Referring now to FIG. 5, an example of a block diagram of a computer system 501 that may be representative of the policy server 140 in which the embodiments presented may be implemented is shown. The computer system 501 may be programmed to implement a computer based device, such as a policy server in an identity-based network access control system. The computer system 501 includes a bus 502 or other communication mechanism for communicating information, and a processor 503 coupled with the bus 502 for processing the information. While the figure shows a single block 503 for a processor, it should be understood that the processors 503 may represent a plurality of processing cores, each of which can perform separate processing. The computer system 501 also includes a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor 503. In addition, the main memory 504 may be used for storing temporary variables or other intermediate information during the execution of instructions by the processor 503.

The computer system 501 further includes a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 also includes a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive, solid state drive, etc.). The storage devices may be added to the computer system 501 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, include types of processing circuitry. The processing circuitry may be located in one device or distributed across multiple devices.

The computer system 501 may also include a display controller 509 coupled to the bus 502 to control a display 510, such as a cathode ray tube (CRT), liquid crystal display (LCD) or light emitting diode (LED) display, for displaying information to a computer user. The computer system 501 includes input devices, such as a keyboard 511 and a pointing device 512, for interacting with a computer user and providing information to the processor 503. The pointing device 512, for example, may be a mouse, a trackball, track pad, touch screen, or a pointing stick for communicating direction information and command selections to the processor 503 and for controlling cursor movement on the display 510. In addition, a printer may provide printed listings of data stored and/or generated by the computer system 501.

The computer system 501 performs a portion or all of the processing steps of the operations presented herein in response to the processor 503 executing one or more sequences of one or more instructions contained in a memory, such as the main memory 504. Such instructions may be read into the main memory 504 from another computer readable storage medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable storage medium or memory for holding instructions programmed according to the embodiments presented, for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM, DVD), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 501, for driving a device or devices for implementing the operations presented herein, and for enabling the computer system 501 to interact with a human user (e.g., a network administrator). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a wired or wireless network interface card to attach to any packet switched (wired or wireless) LAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local area network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 501 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 513. Moreover, the network link 514 may provide a connection through a LAN 515 to a mobile device 517 such as a personal digital assistant (PDA), tablet computer, laptop computer, or cellular telephone.

In summary, the techniques presented herein enable sending NAT mappings from a NAT device as AAA accounting records so that a policy server (e.g., an ISE) can correlate information from an identity server (e.g., an AD server) and a network element. The correlation enables the policy server to determine an identity-based network access policy and program the network elements in the network according to the appropriate policy when on-boarding a new client device. The techniques described herein resolve the issue of a NAT device breaking the correlation between the IP address provided by the identity server and the IP address provided by the network element connected to the on-boarding client device.

In one form, a method is provided for a policy server to correlate information from several messages associated with a client device. The policy server receives a first message from a network element connected to the client device. The first message requests an identity-based policy for network communications of the client device. The first message includes a first network address. The policy server receives a second message from an identity server. The second message includes information indicating an identity role and a second network address. The policy server receives a third message from a NAT device (a network element configured to perform a NAT service). The third message includes a NAT mapping that correlates the first network address with the second network address. The NAT device translate the first network address to the second network address in an authentication session between the client device and the identity server. After the policy server determines the identity-based policy based on a combination of the first message, the second message, and the third message, the policy server implements the identity-based policy in the network element.

In another form, an apparatus is provided comprising a network interface unit and a processor. The network interface unit is configured to receive a first message from a network element connected to a client device. The first message requests an identity-based policy for network communications of the client device, and includes a first network address. The network interface unit is also configured to receive a second message from an identity server. The second message includes information indicating an identity role and a second network address. The network interface unit is further configured to receive a third message from a NAT device. The third message includes a NAT mapping that correlates the first network address with the second network address. The NAT device translates the first network address to the second network address in an authentication session between the client device and the identity server. The processor is configured to determine the identity-based policy based on a combination of the first message, the second message, and the third message. The processor is also configured to implement the identity-based policy in the network element.

In a further form, a non-transitory computer readable storage media is provided that is encoded with instructions that, when executed by a processor in a computing device, cause the processor to receive a first message from a network element connected to a client device. The first message requests an identity-based policy for network communications of the client device, and includes a first network address. The instructions cause the processor to receive a second message from an identity server. The second message includes information indicating an identity role and a second network address. The instructions cause the processor to receive a third message from a NAT device. The third message includes a NAT mapping correlating the first network address with the second network address. The NAT device translates the first network address to the second network address in an authentication between the client device and the identity server. The instructions also cause the processor to determine the identity-based policy based on a combination of the first message the second message, and the third message. The instructions further cause the processor to implement the identity-based policy in the network element.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:
   at a policy server, receiving a first message from a network element connected to a client device, wherein the first message requests an identity-based policy for network communications of the client device, and wherein the first message includes a first network address;
   receiving a second message from an identity server, wherein the second message includes information indicating an identity role and a second network address;
   receiving a third message from a network address translation (NAT) device, the third message including a NAT mapping that correlates the first network address with the second network address, wherein the NAT device translates the first network address to the second network address in an authentication session between the client device and the identity server;
   determining the identity-based policy based on a combination of the first message, the second message, and the third message; and
   implementing the identity-based policy in the network element.

2. The method of claim 1, wherein implementing the identity-based policy in the network element comprises sending the identity-based policy to a network controller.

3. The method of claim 1, wherein implementing the identity-based policy in the network element comprises sending the identity-based policy to a plurality of network elements including the network element connected to the client device.

4. The method of claim 1, wherein the third message is an accounting record correlating the first network address with the second network address.

5. The method of claim 1, further comprising:
   updating the identity-based policy; and
   implementing the updated identity-based policy in the network element.

6. The method of claim 5, wherein the updated identity-based policy is determined in response to receiving a fourth message from the identity server, the fourth message including an updated identity role.

7. The method of claim 5, wherein the updated identity-based policy is based on an updated correlation of the first message, the second message, and the third message.

8. An apparatus comprising:
   a network interface unit configured to:
   receive a first message from a network element connected to a client device, wherein the first message requests an identity-based policy for network communications of the client device, and wherein the first message includes a first network address;
   receive a second message from an identity server, wherein the second message includes information indicating an identity role and a second network address;
   receive a third message from a network address translation (NAT) device, the third message including a NAT mapping that correlates the first network address with the second network address, wherein the NAT device translates the first network address to the second network address in an authentication session between the client device and the identity server; and
   a processor configured to:
   determine the identity-based policy based on a combination of the first message, the second message, and the third message; and
   implement the identity-based policy in the network element.

9. The apparatus of claim 8, wherein the processor is configured to implement the identity-based policy in the network element by causing the network interface unit to send the identity-based policy to a network controller.

10. The apparatus of claim 8, wherein the processor is configured to implement the identity-based policy in the network element by sending the identity-based policy to a plurality of network elements including the network element connected to the client device.

11. The apparatus of claim 8, wherein the network interface unit is configured to receive the third message as an accounting record correlating the first network address with the second network address.

12. The apparatus of claim 8, wherein the processor is further configured to:
   update the identity-based policy; and
   implement the updated identity-based policy in the network element.

13. The apparatus of claim 12, wherein the processor is configured to update the identity-based policy in response to the network interface unit receiving a fourth message from the identity server, the fourth message including an updated identity role.

14. The apparatus of claim 12, wherein the processor is configured to update the identity-based policy based on an updated correlation of the first message, the second message, and the third message.

15. One or more non-transitory computer readable storage media encoded with computer executable instructions operable to cause a processor in a computing device to:
   receive a first message from a network element connected to a client device, wherein the first message requests an identity-based policy for network communications of the client device, and wherein the first message includes a first network address;
   receive a second message from an identity server, wherein the second message includes information indicating an identity role and a second network address;
   receive a third message from a network address translation (NAT) device, the third message including a NAT mapping that correlates the first network address with the second network address, wherein the NAT device translates the first network address to the second network address in an authentication session between the client device and the identity server;

determine the identity-based policy based on a combination of the first message, the second message, and the third message; and implement the identity-based policy in the network element.

16. The computer readable media of claim 15, further comprising instructions operable to cause the processor to implement the identity-based policy in the network element by sending the identity-based policy to a network controller.

17. The computer readable media of claim 15, further comprising instructions operable to cause the processor to implement the identity-based policy in the network element by sending the identity-based policy to a plurality of network elements including the network element connected to the client device.

18. The computer readable media of claim 15, wherein the third message is an accounting record correlating the first network address with the second network address.

19. The computer readable media of claim 15, further comprising instructions operable to cause the processor to:
update the identity-based policy in response to receiving a fourth message from the identity server, the fourth message including an updated identity role; and
implement the updated identity-based policy in the network element.

20. The computer readable media of claim 15, further comprising instructions operable to cause the processor to:
update the identity-based policy based on an updated correlation of the first message, the second message, and the third message; and
implement the updated identity-based policy in the network element.

* * * * *